J. MEYER.
CONTROL APPARATUS FOR TRACTORS.
APPLICATION FILED MAR. 16, 1920.
1,394,209.
Patented Oct. 18, 1921.
3 SHEETS—SHEET 1.
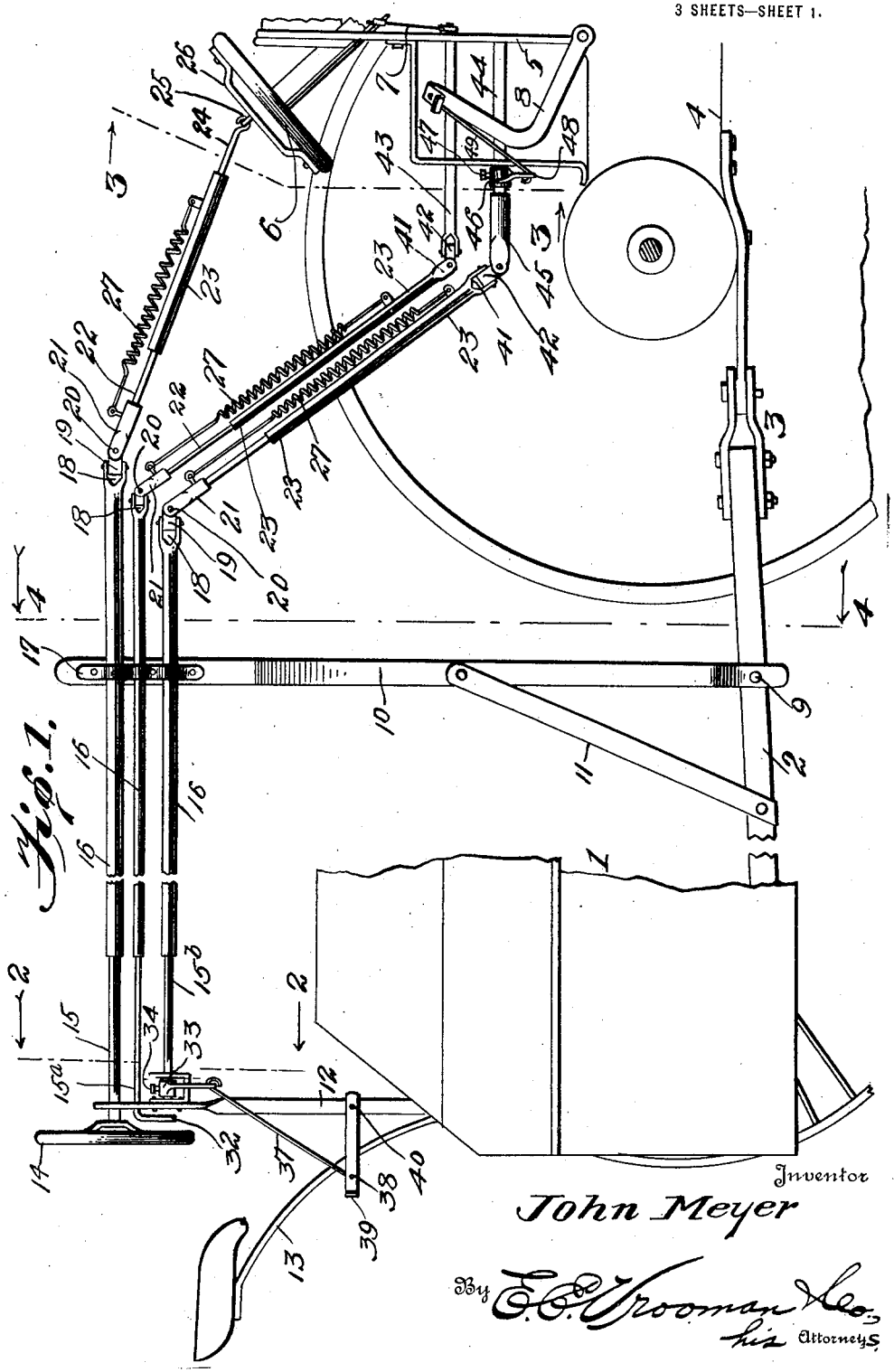
Inventor
John Meyer J. MEYER.
CONTROL APPARATUS FOR TRACTORS.
APPLICATION FILED MAR. 16, 1920.
1,394,209.
Patented Oct. 18, 1921.
3 SHEETS—SHEET 2.
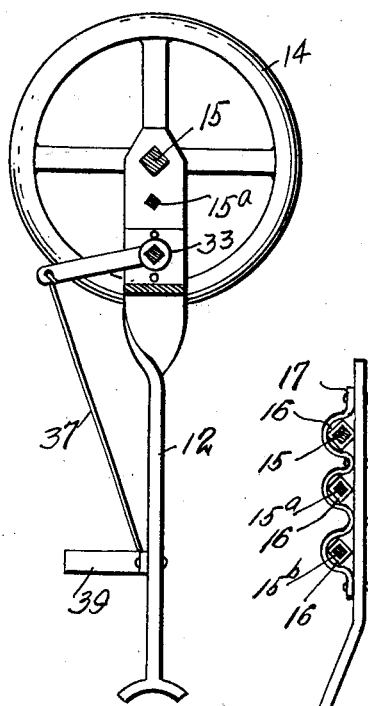
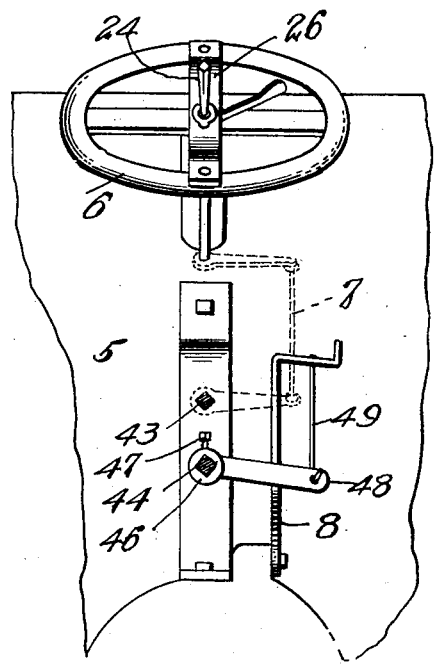
Inventor
John Meyer
By E. E. Vrooman & Co.,
his Attorneys

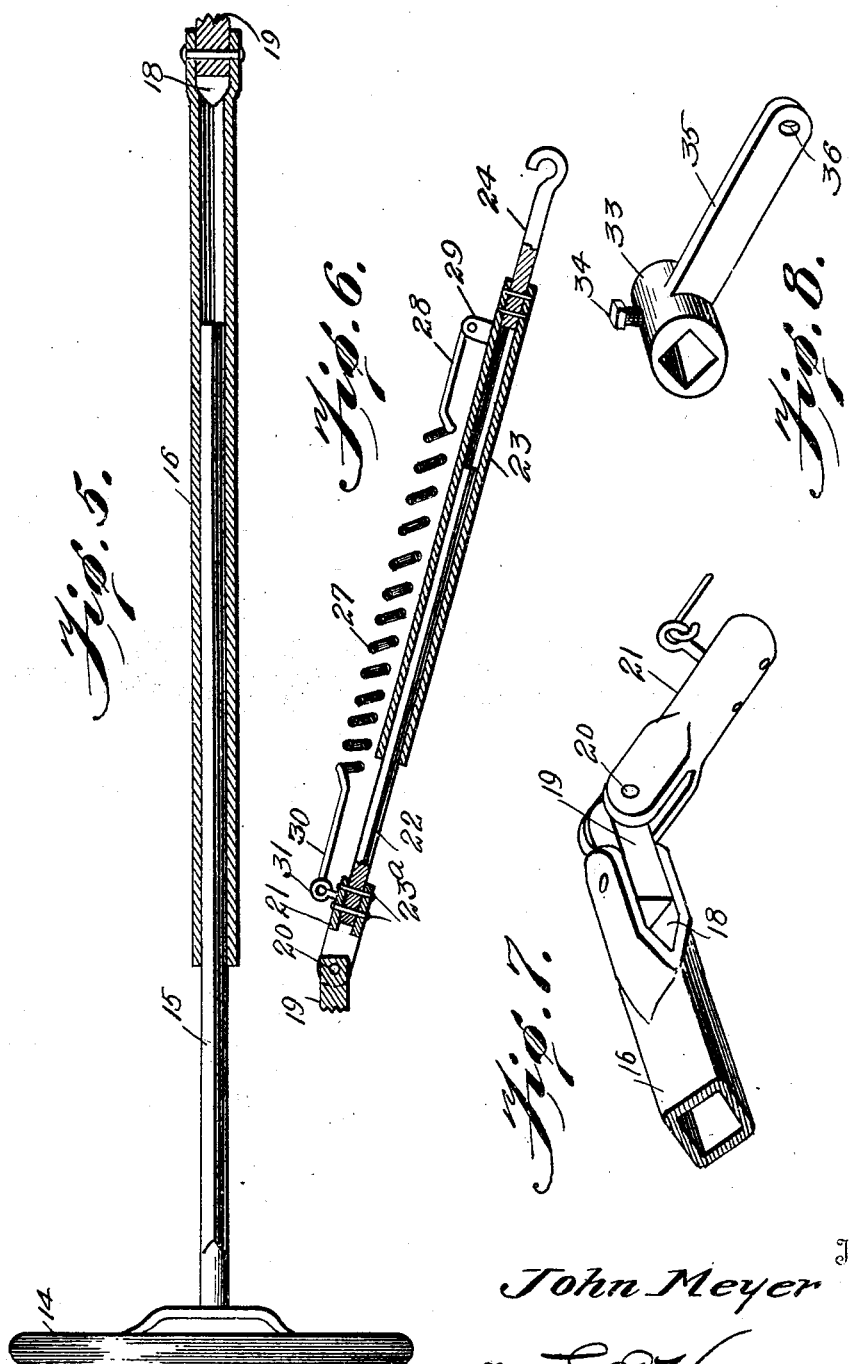

UNITED STATES PATENT OFFICE.

JOHN MEYER, OF GRAY, IOWA.

CONTROL APPARATUS FOR TRACTORS.

1,394,209.　　　　Specification of Letters Patent.　　Patented Oct. 18, 1921.

Application filed March 16, 1920. Serial No. 366,305.

*To all whom it may concern:*

Be it known that I, JOHN MEYER, a citizen of the United States, residing at Gray, in the county of Audubon and State of Iowa, have invented certain new and useful Improvements in Control Apparatus for Tractors, of which the following is a specification, reference being had therein to the accompanying drawings.

This invention relates to a control apparatus for tractors, and more particularly to means operated from a trailer, such as a binder, pulled by a tractor for controlling the tractor from the trailer.

The object of the invention is the provision of means on a trailer, or binder, pulled or hauled by a tractor, whereby the tractor can be efficiently controlled from the seat on the trailer.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a view in side elevation of an apparatus constructed in accordance with the present invention.

Fig. 2 is a sectional view taken on line 2—2, Fig. 1, and looking in the direction of the arrows.

Fig. 3 is a sectional view taken on line 3—3, Fig. 1, and looking in the direction of the arrows.

Fig. 4 is a sectional view taken on line 4—4, Fig. 1, and looking in the direction of the arrows.

Fig. 5 is a fragmentary sectional view of the steering control device.

Fig. 6 is a fragmentary sectional view of the sliding connection with the steering control device.

Fig. 7 is a perspective view of the swivel device, common to the three devices, constituting my control apparatus.

Fig. 8 is a perspective view of the sleeve and arm device of the clutch control device.

Referring to the drawings by numerals, 1 designates the trailer, or binder, and 2 is the tongue thereof, which is connected by the coupling device 3 to the tractor 4. The tractor 4 is provided with a dash 5, with which dash is assembled the steering wheel 6, the gas control 7 and the clutch control member 8.

On the tongue 2 is secured, at 9, a primary standard 10, which is provided with a brace 11. An auxiliary standard 12 is mounted upon the trailer 1, contiguous to the seat 13.

The steering control device comprises a wheel 14 fixedly secured to a square rod 15, (Fig. 5) which rod is slidably mounted in a primary sleeve 16. This sleeve 16 is suitably mounted in bracket 17, fastened near the upper end of the primary standard 10. The outer end of the sleeve 16 is bifurcated, as at 18, and in this bifurcated end 18 is pivotally secured the block 19 of the swivel device. Pivotally mounted, at 20, on the outer end of the block 19 is a bifurcated sleeve 21. An auxiliary rod 22, which is square, is fastened at 23ª, Fig. 6, in the sleeve 21, and this rod is slidably mounted at its outer end in the auxiliary sleeve 23. In the outer end of the auxiliary sleeve 23 is fastened a hook 24, and this hook 24 is fastened, at 25, to plate 26, that is rigidly fastened to the steering wheel 6. Upon rotary movement being imparted to the hook 24, the steering wheel 6 will likewise be rotated.

A spring take-up device is common to my steering control device, my gas control device and my clutch control device, all of which are a part of my control apparatus. This spring take-up device comprises a coil spring 27, that has one end 28 secured to an integral ear 29, on the outer end of the auxiliary sleeve 23, and the other end 31, of the spring 27, is fastened in an eye-bolt 31, integral with the sleeve 21. Upon the tractor and trailer going over uneven ground, or climbing a hill, or crossing a ditch, the spring and sliding rod 22 will permit the variation in the movement of the parts, the spring taking up the "slack" or expansion of rod 22 and sleeve 23, as soon as the tractor and trailer are in a normal, level, or horizontal position, such as when traveling over even, flat ground. I have the primary rod 15 slidably mounted in the primary sleeve 16, so that slight twisting or elongation of the parts, supporting the seat and the tongue, will permit of a sliding extension between the parts of the control device and, yet, not impair its efficiency, for by the operator turning wheel 14, whether the tractor and trailer (binder) are traveling over even or uneven ground, the steering wheel 6 will be immediately turned to correspond with the turning of the wheel 14 near the seat 13, this operation having been fully and satisfactorily demonstrated by extensive tests with a full-sized machine, that I have constructed.

The gas control device is very similar in construction to the steering wheel controlling device and I will only designate the slight uncommon features of the gas control device. The primary rod 15$^a$ is bent down, as at 32, to provide a throttle grip; this rod 15$^a$ is square and is slidably mounted in primary sleeve 16, which sleeve 16 is carried in the bracket 17, and the swivel device is the same structure identically as the swivel device used in the construction of the steering control device.

The primary rod 15$^b$, of the clutch control device, has a sleeve 33, fastened thereon by a bolt 34, and this sleeve is provided with an integral outwardly-extending arm 35. Pivotally mounted, at is upper end, in the aperture 36 of the arm 35, is a link 37, which link is pivotally mounted, at 38, in the foot pedal 39, which pedal is pivotally mounted, at 40, upon the auxiliary standard 12; by the operator pressing upon the foot pedal 39, the clutch control member 8 will be operated.

The outer ends of the sleeves 23, of the gas control and clutch control device, are bifurcated, as at 41, and in these bifurcated ends are secured blocks 42. A bifurcated rod 43 is connected, at one end, to the block 42 of the gas control and the outer end of the rod 43 is connected to the gas control 7. A rod 44 is suitably mounted upon the tractor and is connected to the block 42 by sleeve 45. A collar 46 is fastened, by bolt 47, to rod 44, and this collar is provided with an arm 48, in which arm 48 is pivotally mounted one end of link 49, the other end of the link being suitably connected to the clutch control member 8.

By turning the grip 32, the gas control 7 on the tractor will be operated, for controlling the supply of gasolene to the engine, and by manipulating the foot pedal 39, the clutch member 8 will be controlled.

It will be understood, from the foregoing description, that I have provided three similarly constructed control devices that are of an expansible nature for controlling the steering, gas supply and clutch devices of the tractor from the ordinary seat of a trailer, or binder, and that each device is substantially a duplicate of the other, except that their outer ends are slightly different in construction for particular reasons, with reference to the operation of each device and its manner of connection to the coöperating portion of the tractor.

I wish it to be understood that, in the appended claims, the word "trailer" is used in a broad sense, meaning any kind of an apparatus, such as a binder that may be attached to and drawn over the ground by a tractor, and that a "tractor governing device" means either the steering wheel or the gas control, or the clutch member.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such minor alterations or changes as shall fairly fall within the spirit and scope of the appended claims.

What I claim is:

1. In an apparatus of the class described, the combination with a tractor and a trailer attached thereto, said tractor provided with a governing device, of a control device supported upon the trailer and comprising a primary sleeve, a primary rod slidably mounted in said sleeve against independent rotary movement, said sleeve provided at its outer end with a bifurcation, a block pivotally mounted in said bifurcation, a sleeve pivotally mounted upon the outer end of said block, an auxiliary rod fastened in said last-mentioned sleeve, an auxiliary sleeve mounted upon said auxiliary rod, a spring attached at one end to said auxiliary sleeve and at its other end to said sleeve mounted on the outer end of the block, and means connecting the outer end of said auxiliary sleeve to the governing device of the tractor.

2. In an apparatus of the class described, the combination with a tractor and a trailer attached thereto, said tractor provided with a governing device, of a control device connected to said governing device, said control device comprising a pair of rods, a pair of sleeves slidably mounted upon said rods, means swivelly connecting one of the rods to one of the sleeves, means connecting the other sleeve to the governing device, a coil spring contiguous to one of the sleeves and one of the rods, and means connecting one end of the spring to the sleeve and the other end of the spring to the rod, whereby the spring normally exerts a strain or pull for drawing the rod into the sleeve.

3. In an apparatus of the class described, the combination with a tractor and a trailer attached thereto, said tractor provided with a governing device, of a control device extending to said trailer, said control device including a primary sleeve, a block pivotally connected thereto, a bifurcated sleeve provided with an eyebolt pivotally connected to said block, a rod fastened at one end in said bifurcated sleeve, an auxiliary sleeve slidably mounted on said rod and provided with an ear near its outer end, a spring fastened at one end to said ear and at its other end to said eyebolt, and means secured to the outer end of said auxiliary sleeve for fastening said control device to said governing device.

In testimony whereof I hereunto affix my signature.

JOHN MEYER.